June 9, 1964   A. R. CONVISER ETAL   3,136,858
MONITOR DEVICE FOR A SWITCH OPERATED INSTRUMENT
Filed June 2, 1961   3 Sheets-Sheet 1

INVENTORS
Arthur R. Conviser
Victor W. Farb
BY Daniel Jay Tick
Attorney

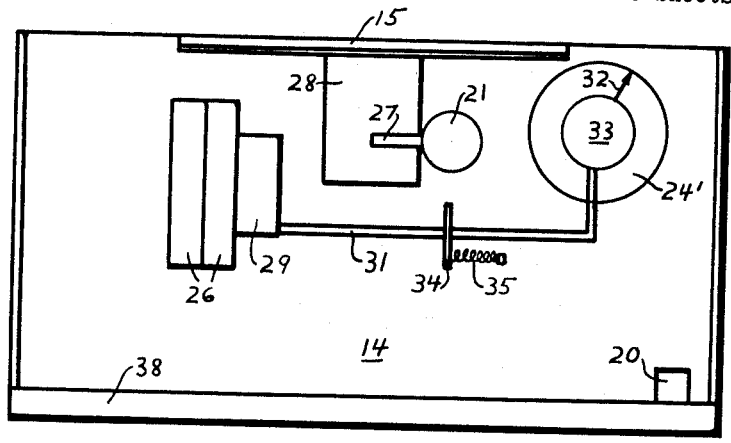
Fig. 4
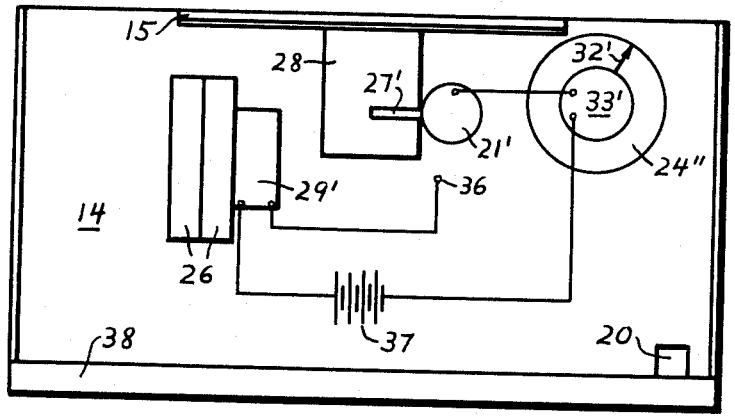
Fig. 5
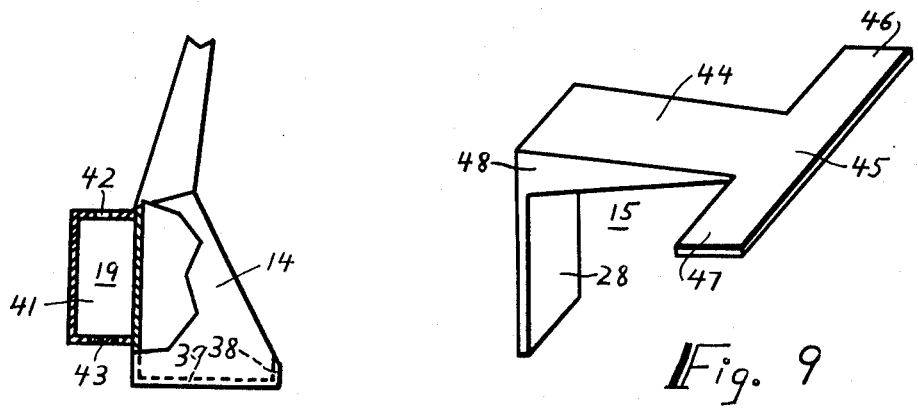
Fig. 6
Fig. 9
INVENTORS
Arthur R. Conviser
Victor W. Farb
BY Daniel Jay Tick
Attorney

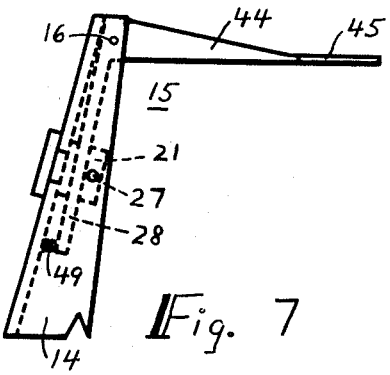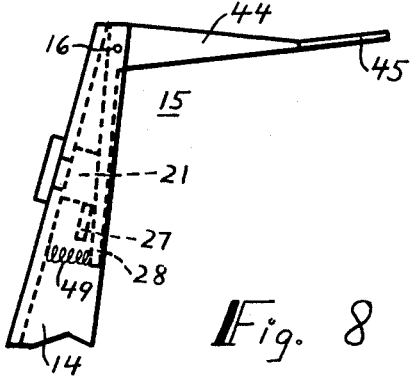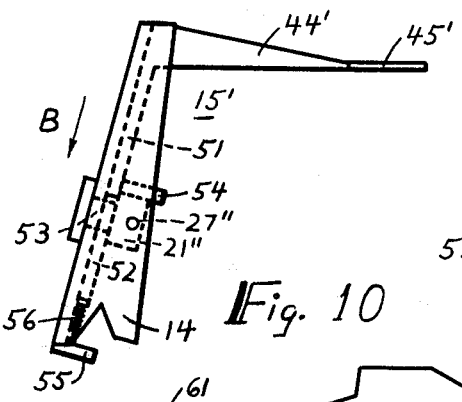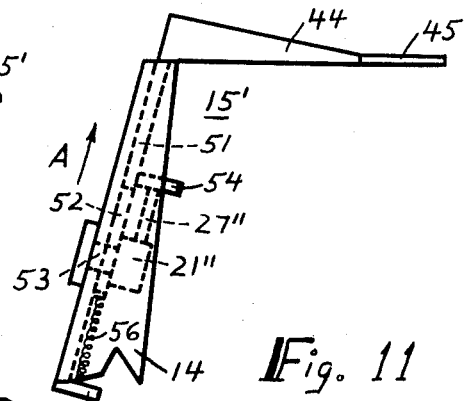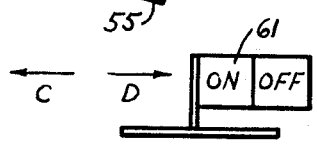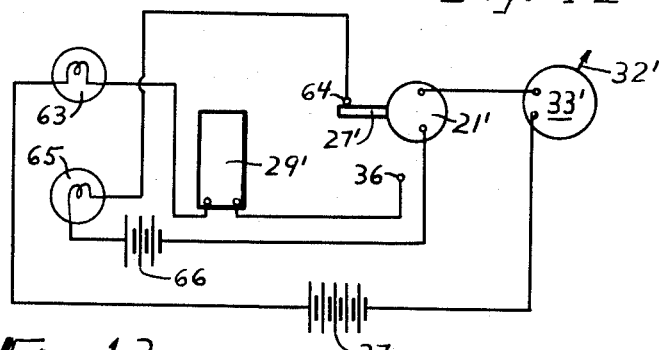

United States Patent Office 3,136,858
Patented June 9, 1964

3,136,858
MONITOR DEVICE FOR A SWITCH OPERATED INSTRUMENT
Arthur R. Conviser, Brooklyn, N.Y., and Victor W. Farb, 2113 Ave. V, Brooklyn 29, N.Y.; said Conviser assignor to said Farb
Filed June 2, 1961, Ser. No. 124,752
12 Claims. (Cl. 179—7.1)

The present invention relates to a monitor device for a switch-operated instrument. More particularly, the present invention relates to a telephone monitor device.

The principal object of the present invention is to provide a new and improved monitor device for a switch-operated instrument.

An object of the present invention is to provide a switch-operated instrument monitor device for restricting the use of a switch-operated instrument to authorized persons.

An object of the present invention is to provide a switch-operated instrument monitor device for locking a switch-operated instrument to prevent its use by unauthorized persons.

An object of the present invention is to provide a switch-operated instrument monitor device for registering the number of changes in operating condition of a switch-operated instrument.

An object of the present invention is to provide a switch-operated instrument monitor device for timing the duration of a change in operating condition of a switch-operated instrument.

An object of the present invention is to provide a switch-operated instrument monitor device for indicating the operating condition of a switch-operated instrument.

An object of the present invention is to provide a switch-operated instrument monitor device for storing coins contributed by persons using a switch-operated instrument.

An object of the present invention is to provide a switch-operated instrument monitor device which functions to lock a switch-operated instrument to prevent its use by unauthorized persons, to register the number of changes in operating condition of the switch-operated instrument, to time the duration of a change in operating condition of the switch-operated instrument, to indicate the operating condition of the switch-operated instrument and to store coins contributed by persons using the switch-operated instrument.

An object of the present invention is to provide a switch-operated instrument monitor device which is of simple structure, light weight and rugged and compact.

An object of the present invention is to provide a switch-operated instrument monitor device which is efficient and reliable in operation.

An object of the present invention is to provide a switch-operated instrument monitor device which is facilely and readily used with a switch-operated instrument and which may be facilely and readily removed from an instrument with which it is used.

An object of the present invention is to provide a new and improved telephone monitor device.

An object of the present invention is to provide a telephone monitor device for restricting the use of a telephone to authorized persons.

An object of the present invention is to provide a telephone monitor device for locking a telephone to prevent its use by unauthorized persons.

An object of the present invention is to provide a telephone monitor device for registering the number of calls made on a telephone.

An object of the present invention is to provide a telephone monitor device for timing the duration of a call made on a telephone.

An object of the present invention is to provide a telephone monitor device for indicating the locked or unlocked condition of a telephone.

An object of the present invention is to provide a telephone monitor device for storing coins contributed by persons using a telephone.

An object of the present invention is to provide a telephone monitor device which functions to lock a telephone to prevent its use by unauthorized persons, to register the number of calls made on the telephone, to time the duration of a call made on the telephone, to indicate the locked or unlocked condition of the telephone and to store coins contributed by persons using the telephone.

An object of the present invention is to provide a telephone monitor device which is of simple structure, light weight and rugged and compact.

An object of the present invention is to provide a telephone monitor device which is efficient and reliable in operation.

An object of the present invention is to provide a telephone monitor device which is facilely and readily used with a telephone and which may be facilely and readily removed from a telephone with which it is used.

In accordance with the present invention a monitor device for an instrument having a switch adapted to put the instrument in a first condition of operation in a first condition of the switch and to put the instrument in a second condition of operation in a second condition of the switch comprises a housing adapted to be positioned in proximity with the instrument. A lock for controlling the condition of the switch of the instrument is supported by the housing and is adapted to cooperate with the switch to maintain the switch in its first condition in a lock condition of the lock and to permit the switch to maintain its second condition in an unlock condition of the lock. A register supported by the housing in spaced relation to the lock registers the number of times the lock is in its unlock condition and is adapted to be operated by the lock each time the lock changes from its lock to its unlock condition. A timer supported by the housing in spaced relation to the lock and the register indicates the period of time elapsed between activation and deactivation of the timer and is adapted to be activated by the lock each time the lock changes from its lock to its unlock condition to be deactivated by the lock each time the lock changes from its unlock to its lock condition. An indicator supported by the housing in spaced relation to the lock, register and timer indicates the condition of the lock and is adapted to indicate an On condition when the lock is in its unlock condition and an Off condition when the lock is in its lock condition. A storing device supported by the housing is adapted to store a plurality of coins therein and has a storage area, an input aperture formed in the storing device and adapted to receive coins and guide the coins to the storage area and an output formed therein and adapted to permit the removal of coins from the storage area.

In order that the present invention may be readily carried into effect, it will now be described with reference to the accompanying drawings, wherein:

FIG. 4 is a back view of a modification of the embodiment of the monitor device of FIG. 3;

FIG. 5 is a back view of another modification of the embodiment of the monitor device of FIG. 3;

FIG. 6 is a side view, partly in section, of an embodiment of the storing device of the embodiment of the monitor device of FIG. 3;

FIG. 7 is a side view of an embodiment of the lock of the embodiment of the monitor device of FIG. 3 in lock condition;

FIG. 8 is a side view of the embodiment of the lock of FIG. 3 in unlock condition;

FIG. 9 is a perspective view of the embodiment of the lock of FIG. 3;

FIG. 10 is a side view of another embodiment of the lock of the embodiment of the monitor device of FIG. 3 in lock condition;

FIG. 11 is a side view of the embodiment of the lock of FIG. 10 in unlock condition;

FIG. 12 is an exploded view of an embodiment of a mechanically operated indicator which may be utilized with the embodiment of the monitor device of FIG. 4; and FIG. 13 is a schematic circuit diagram of an embodiment of the control circuit arrangement of the embodiment of the monitor device of FIG. 5 including an embodiment of an electrically operated indicator.

Figure 1:
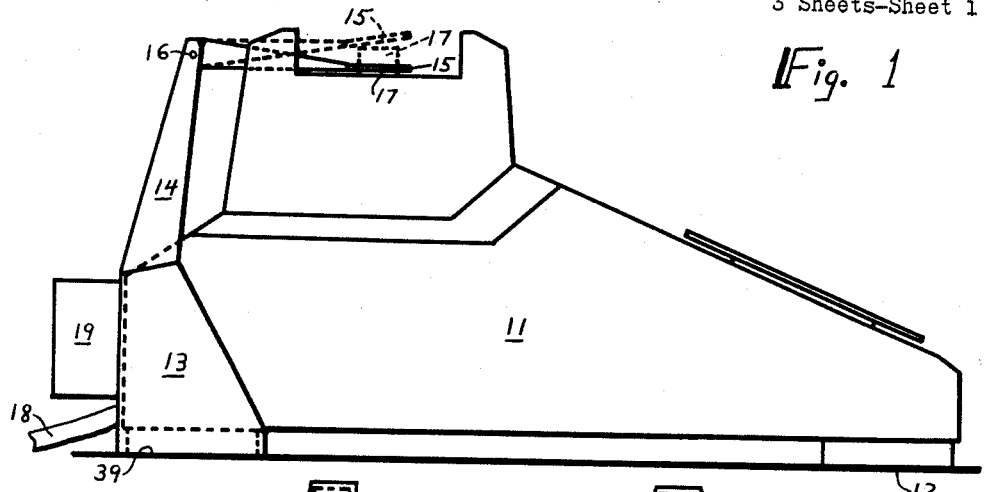
FIG. 1 is a side view of an embodiment of a monitor device of the present invention in operable position on a type of telephone.
Figure 2:
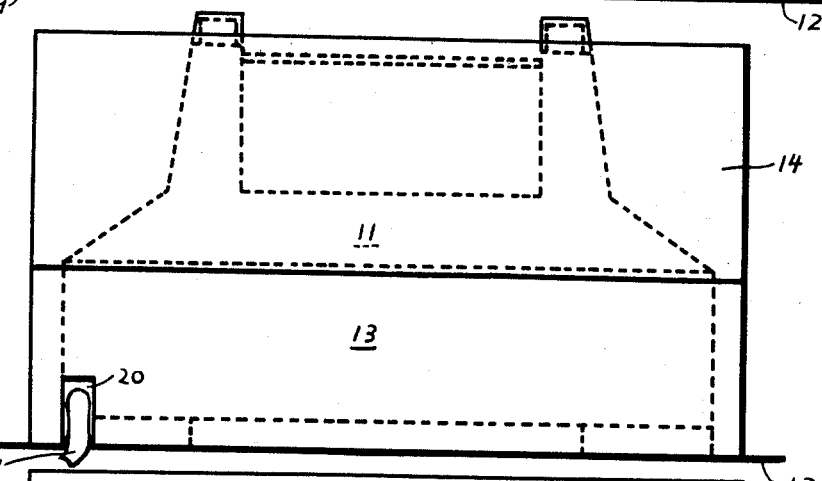
FIG. 2 is a back view of the embodiment of the monitor device of FIG. 1 in operable position on the type of telephone of FIG. 1.

FIGS. 1 and 2 are views of an embodiment of the monitor device of the present invention in operable position on a type of telephone. The monitor device of the present invention is illustrated in FIGS. 1 and 2 as a telephone monitor device although said monitor device may be utilized with any suitable known type of switch-operated instrument including a line telephone handset, a radio telephone handset and a power switch or meter device. Furthermore, although the monitor device of the present invention is illustrated in FIGS. 1 and 2 as positioned on a standard type of telephone handset it may be easily modified to be positioned on any type of telephone handset, such as, for example, the so-called "Princess" telephone handset of the Bell Telephone Company.

In FIGS. 1 and 2 a standard type of telephone handset 11 is supported by a supporting surface 12, such as, for example, a table top. The telephone handset 11 is shown in broken lines in FIG. 2 and partially in broken lines in FIG. 1 in order to illustrate the position of a monitor device 13 of the present invention thereon.

The monitor device 13 comprises several components, illustrated in and described with reference to the other figures of the drawings, which are not shown in FIGS. 1 and 2 in order to enhance the clarity of presentation. Among these several components are a housing 14 and a lock (not completely shown in FIGS. 1 and 2) having a locking arm 15 of substantially combined L and T configuration which may be pivotally supported on the housing 14 in inverted position at its apex by pivot means 16.

The telephone handset 11 includes a line switch 17 adapted to disconnect the telephone 11 from a telephone line connected to a handset line 18 and thereby prevent its use in an open condition of said line switch illustrated by the position of said line switch shown in solid lines in FIGS. 1 and 2. The line switch 17 is adapted to connect the telephone 11 to a telephone line connected to the handset line 18 and thereby permit its use in a closed condition of said line switch illustrated by the position of said line switch shown in broken lines in FIGS. 1 and 2. The handpiece of the telephone 11 is not shown in the figures.

The housing 14 is adapted to be positioned in proximity with the telephone 11 and its configuration may be easily modified to adapt it for positioning on different types of telephones and switch-operated instruments. The lock controls the condition of the line switch 17 of the telephone 11. The locking arm 15 extends a sufficient distance from the housing 14 to enable its contact end area to contact the line switch 17, as will be described with reference to FIGS. 7, 8 and 9, and thereby enables said locking arm to maintain said line switch in its open condition in a lock condition of said locking arm shown in solid lines in FIGS. 1 and 2. The locking arm 15 is so mounted on the housing 14 as to permit the line switch 17 to maintain its closed condition in an unlock condition of said locking arm shown in solid lines in FIGS. 1 and 2.

The locking arm 15 is controlled in position by a locking control, which is not shown in FIGS. 1 and 2 in order to enhance the clarity of illustration. A storing device 19 is shown in FIG. 1 as supported by the housing 14 and may be affixed to said housing by any suitable means or may be integrally formed with said housing. The storing device 19 includes a storage area (not shown in FIGS. 1 and 2) adapted to store a plurality of coins therein, an input aperture (not shown in FIGS. 1 and 2) formed in said storage area adapted to receive coins and to guide said coins to said storage area and an output formed therein and adapted to permit the removal of coins from said storage area. An aperture 20 is formed through the housing 14 to permit passage of the handset line 18.

Throughout the specification, the same components appearing in different figures are identified by the same reference numerals; the same components appearing in different modifications or embodiments being identified by the same reference numerals primed and double-primed.

Figure 3:
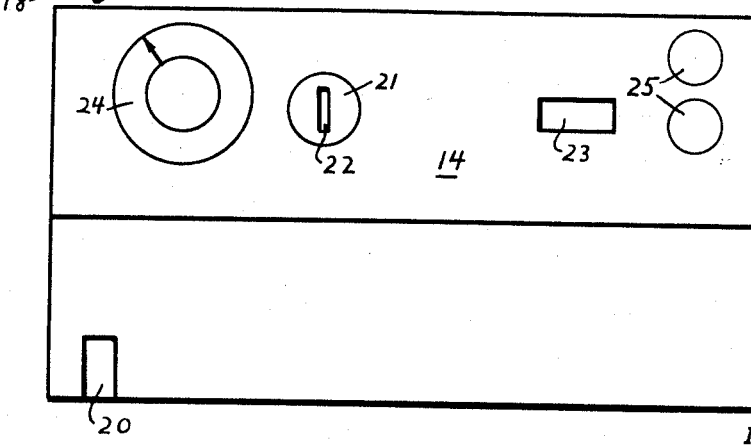
FIG. 3 is a front view of the embodiment of the monitor device of FIGS. 1 and 2.

FIG. 3 is a front view of the embodiment of the monitor device of FIGS. 1 and 2. The locking control includes a key-operated lock member 21 supported in an aperture formed through the housing 14 in such a manner that it is operated by a key inserted in a keyhole 22 thereof.

A register (not shown in FIG. 3) is supported by the housing 14 in spaced relation to the lock and lock member 21 and is preferably supported adjacent an aperture 23 formed through said housing in such a manner that it indicates the number registered thereby clearly to a person looking at said housing.

A timer 24 is supported by the housing 14 in spaced relation to the lock and the register and is preferably supported in an aperture formed through said housing in such a manner that it indicates the time indicated thereby clearly to a person looking at said housing.

An indicator (not shown in FIG. 3) is supported by the housing 14 in spaced relation to the lock, the register and the timer 24 and is preferably supported adjacent an aperture or apertures 25 formed through said housing in such a manner that it provides an indication clearly visible to a person looking at said housing.

FIG. 4 is a back view of a modification of the embodiment of the monitor device of FIG. 3. The lock member 21 includes a control arm 27 which cooperates with the locking arm 15 in a manner whereby said locking arm is maintained in its lock condition in a lock position of the locking control, as illustrated in FIGS. 4 and 7, in which lock position said control arm holds the lower portion 28 of said locking arm substantially adjacent the housing 14. The control arm 27 cooperates with the locking arm 15 in a manner whereby said locking arm is maintained in its unlock condition in an unlock position of the locking control, as illustrated in FIG. 8, in which unlock position said control arm permits the lower portion 28 of said locking arm to be urged a distance from the housing 14.

The register 26 is mechanically coupled to the lock member 21 of the locking control in a manner whereby said register is operated by said lock member each time said lock member changes from its lock to its unlock position. The register 26 thus registers the number of times the locking control is in its unlock position.

The register 26 may comprise any suitable known register unit, such as, for example, one or more number wheels driven by a register control 29 which may comprise, for example, a spring operated motor adapted to be mechanically operated by a coupling rod 31.

The timer 24' is mechanically coupled to the lock member 21 of the locking control in a manner whereby said timer is activated by said lock member each time said locking control changes from its lock to its unlock position and is deactivated by said lock member each time said locking control changes from its unlock to its lock position. The timer 24' thus indicates the period of time elapsed between activation and deactivation thereof.

The timer 24' may comprise any suitable known timer unit, such as, for example, an indicator arm 32 driven by a timer control 33 which may comprise, for example, a spring operated clock adapted to be mechanically activated by the coupling rod 31.

The coupling rod 31 supports a coupling control member 34 which is fixedly mounted thereon and which may comprise, for example, a substantially annular-shaped member. The coupling control member 34 is positioned at a predetermined point on the coupling rod 31 in a manner whereby when the lock member 21 is in its lock position, shown in FIGS. 4 and 7, said coupling control member does not contact the control arm 27 of said lock member and is maintained in the lock position shown in FIG. 7 by a spring arrangement 35. When the lock member 21 is operated by a key to turn from its lock position to its unlock position, shown in FIG. 8, the control arm 27 of said lock member turns with said lock member in a counterclockwise direction (viewed from the back of the monitor device) and contacts the coupling control member 34. The control arm 27 then urges the coupling rod 31 to the right (viewed from the back of the monitor device) via the coupling control member 34, against the action of the spring arrangement 35, a distance sufficient to operate the register 26 one step via the register control 29 and sufficient to activate the timer 24' via the timer control 33.

The modification of FIG. 4 is thus a completely mechanical arrangement. The embodiment of FIG. 4 may, of course, utilize and include either a mechanically or an electrically operated indicator for indicating the position of the locking control thereby indicating the condition of the line switch of the telephone (FIGS. 1 and 2). An embodiment of a mechanically operated indicator is described with reference to FIG. 12 and an embodiment of an electrically operated indicator is described with reference to FIG. 13.

FIG. 5 is a back view of another modification of the embodiment of the monitor device of FIG. 3. The lock member 21' includes a control arm 27' which cooperates with the locking arm 15 in a manner whereby said locking arm is maintained in its lock condition in a lock position of the locking control, as illustrated in FIGS. 4 and 7, in which lock position said control arm holds the lower portion 28 of said locking arm substantially adjacent the housing 14. The control arm 27' cooperates with the locking arm 15 in a manner whereby said locking arm is maintained in its unlock condition in an unlock position of the locking control, as illustrated in FIG. 8, in which unlock position said control arm permits the lower portion 28 of said locking arm to be urged a distance from the housing 14.

The register 26 is electrically connected to the lock member 21' of the locking control in a manner whereby said register is operated by said lock member each time said lock member changes from its lock to its unlock position, since when said lock member moves from its lock position, shown in FIG. 5, it moves in a counterclockwise direction and in its unlock position closes the control circuit by contacting unlock or control contact 36 with its control arm 27' which is of electrically conductive material. The register 26 thus registers the number of times the locking control is in its unlock position.

The register 26 may comprise any suitable known register unit, such as, for example, one or more number wheels driven by a register control 29' which may comprise, for example, an electric motor adapted to be operated by electrical energy from a source of electrical energy 37 which may comprise any suitable A.C. or D.C. power source. The source of electrical energy 37 may thus comprise, for example, a step-down transformer from the main power line or a dry cell or battery of dry cells.

The timer 24" is electrically connected to the lock member 21' of the locking control in a manner whereby said timer is activated by said lock member each time said locking control changes from its lock to its unlock position and is deactivated by said lock member each time said locking control changes from its unlock to its lock position. This is due to the fact that when the lock member 21' moves from its lock position, shown in FIG. 5, it moves in a counterclockwise direction and in its unlock position closes the control circuit by contacting the unlock contact 36 with its control arm 27', and when said lock member moves from its unlock position it moves in a clockwise direction, opening the circuit by disengaging said control arm from said unlock contact 36, and in its lock position maintains an open circuit. The timer 24" thus indicates the period of time elapsed between activation and deactivation thereof.

The timer 24" may comprise any suitable known timer unit, such as, for example, an indicator arm 32' driven by a timer control 33' which may comprise, for example, an electric clock adapted to be activated and driven by electrical energy from the source of electrical energy 37.

An electrical circuit electrically connects the source of electrical energy, the register control 29', the timer control 33' and the lock member 21' of the locking control in a manner whereby the register 26 is operated by said lock member each time said lock member changes from its lock to its unlock position and the timer 24" is activated by said lock member each time said lock member changes from its lock to its unlock position and is deactivated by said lock member each time said lock member changes from its unlock to its lock position. This is due to the control circuit connecting the register control 29' and the timer control 33' in circuit with the lock member 21' and the source of electrical energy 37. When the lock member 21' is in its lock position, its control arm 27' is separated from the control contact 36 and the circuit is open so that each of the register control 29' and timer control 33' is deenerigzed. When the lock member 21' is in its unlock position, its control arm 27' physically and electrically contacts the control contact 36 and the circuit is closed so that each of the register control 29' and timer control 33' is energized.

Each of the register controls 29 and 29' is of known type which functions to move the number wheel or wheels of the register 26 to the next indication each time each said register control is energized. Thus, the register 26 indicates each time the lock member 21 and 21', respectively, changes from its lock to its unlock position and therefore each time use is made of the instrument or telephone protected by the monitor device of the present invention. The lock member 21 and 21', respectively, prevents unauthorized use of the instrument or telephone protected by the monitor device of the present invention since it is key-operated. Each of the timer controls 33 and 33' is of known type which functions to move the indicator arm 32 and 32', respectively, continuously from its activation to its deactivation. Thus, the timer 24' and 24" indicates the time elapsed between the positioning of the lock member 21 and 21', respectively, in its unlock position and its return to its lock position and therefore the duration of the use of the instrument or telephone protected by the monitor device of the present invention.

The register 26 may be manually reset after any selected number is reached and the timer 24' and 24", respectively, is adapted to reset in known manner upon deenergization of the timer control 33 and 33', respectively, when the lock member 21 and 21', respectively, moves back from its unlock position to its lock position.

In a preferred embodiment of the invention, the housing 14 is provided with an under ledge or edge portion 38 forming a channel with the base portion 39 (shown in FIGS. 1 and 6) of said housing, and in which channel a pair of base support sections of the telephone or instrument may rest, thereby lending the weight of the telephone or instrument to the support of the monitor device in operable position.

The modification of FIG. 5 is thus a completely electrical arrangement. The embodiment of FIG. 5 may, of course, utilize and include either a mechanically or an electrically operated indicator for indicating the position of the locking control thereby indicating the condition of the line switch of the telephone.

Any suitable combination of mechanical and electrical control arrangements may be utilized and any suitable hydraulically operated components may be utilized with either type of control arrangement.

FIG. 6 is a view of an embodiment of the storing device 19 of the embodiment of the monitor device of FIG. 3 and also clearly shows the under ledge or edge portion 38 and the base portion 39 of the housing 14. The storing device 19 comprises a storage area 41 adapted to store a plurality of coins, an input aperture 42 formed therein and adapted to receive coins and guide said coins to said storage area, and an output 43 adapted to permit the removal of coins from said storage area.

FIGS. 7, 8 and 9 are views of an embodiment of the lock of FIG. 3; FIG. 7 being a side view of the locking arm in lock condition, FIG. 8 being a side view of the locking arm in unlock condition, and FIG. 9 being a perspective view of the locking arm. The locking arm 15 is of substantially L and T configuration, as clearly illustrated in FIG. 9. The lower portion 28 forms a substantially L configuration with an upper portion 44 of the locking arm 15 of the lock of the embodiment of FIG. 3. The upper portion 44 forms a substantially T configuration with a contact portion 45 of the locking arm 15 of the lock of the embodiment of FIG. 3.

The upper portion 44 and the contact portion 45 are preferably substantially coplanar and the lower portion 28 is preferably perpendicular to the plane of said upper and contact portions. One end 46 of the contact portion 45 is adapted to contact one of the line switch 17 members in the lock condition of the locking arm 15 and the other end 47 of said contact portion is adapted to contact the other of said line switch members in the lock condition of said locking arm thereby maintaining said line switch members depressed and in consequence maintaining the line switch in its open or disconnected condition (FIGS. 1 and 2).

The locking arm 15 is pivotally supported on the housing 14 in inverted position at its apex 48 by pivot means 16. In the lock condition of the locking arm 15, shown in FIG. 7, the lower portion 28 of said locking arm is held substantially adjacent the housing 14 by the control arm 27 of the lock member 21 in its lock position. In the unlock condition of the locking arm 15, shown in FIG. 8, the lower portion 28 of said locking arm is released by the control arm 27 of the lock member 21 in its unlock position and is maintained at a distance from the housing 14 by any suitable means, such as, for example, a spring arrangement 49.

The spring arrangement 49 is adapted to normally urge the locking arm 15 to pivot about the pivot 16 in a manner whereby the lower portion 28 of said locking arm is normally urged away from the housing 14. The spring arrangement 49 is arrested in position and cannot operate when the lock member 21 is in its lock position and is free to operate when said lock member is in its unlock position.

FIGS. 10 and 11 are views of another embodiment of the embodiment of the lock of FIG. 3; FIG. 10 being a side view of the locking arm in lock condition and FIG. 11 being a side view of the locking arm in unlock condition. The locking arm 15' is of substantially combined L and T configuration, as is the locking arm 15 shown in FIG. 9. A lower portion 51 forms a substantially L configuration with an upper portion 44' of the locking arm 15" of the lock and the upper portion 44' forms a substantially T configuration with a contact portion 45" of said locking arm.

The upper portion 44' and the contact portion 45' are preferably substantially coplanar and the lower portion 51 is preferably perpendicular to the plane of said upper and contact portions. One end of the contact portion 45' is adapted to contact one of the line switch 17 members in the lock condition of the locking arm 15' and the other end of said contact portion is adapted to contact the other of said line switch members in the lock condition of said locking arm thereby maintaining said line switch members depressed and in consequence maintaining the line switch in its open or disconnected condition (FIGS. 1 and 2) as is the case with the locking arm 15 of FIGS. 7, 8 and 9.

The locking arm 15' is slidably supported on the housing 14 in inverted position by any suitable means, such as, for example, guide or slide members (not shown) adapted to permit slidable movement of said locking arm in the direction of arrows A and B. An elongated slot 52 is formed through the lower portion 51 of the locking arm 15' to permit shaft 53 of the lock member 21" to pass through said lower portion without obstructing or interfering with the free movement of said locking arm in arrow directions A and B.

A projection, dog, or lug 54 is affixed to, or integrally formed with, the lower portion 51 of the locking arm 15' at a point above the slot 52. A projection, dog, or lug 55 is affixed to, or integrally formed with, the housing 14 at a point below the lower portion 51 of the locking arm 15' in its farthest reaching movement in the direction of the arrow B.

A spring arrangement 56 is adapted to normally urge the locking arm 15' to move in the direction of the arrow B in a manner whereby the lower portion 51 of said locking arm is normally urged toward the lug or projection 55. The spring arrangement 56 is effectively arrested in position and cannot operate when the lock member 21" is in its unlock position (FIG. 11) and is free to operate when said lock member is in its lock position (FIG. 10).

In the lock condition of the locking arm 15', shown in FIG. 10, the projection or lug 54 of the lower portion 51 of said locking arm is held substantially adjacent the lock member 21" in its lock position by the spring arrangement 56. As the lock member 21" is turned from its lock to its unlock position, its control arm 27" contacts the projection 54 and pushes it away from said lock member in the direction of the arrow A, so that in the unlock condition of the locking arm 15', shown in FIG. 11, the projection 54 is held at a distance from said lock member by said control arm, against the action of the spring arrangement 56.

FIG. 12 is an exploded view of an embodiment of a mechanically operated indicator which may be utilized with the embodiment of the monitor device of FIG. 4. The indicator 61 comprises a plate marked On and Off, which plate is mechanically coupled to the coupling rod 31 (FIG. 4) in a manner whereby it is moved by said coupling rod in the direction of an arrow C when the lock member 21 is in its lock position and in the direction of an arrow D when said lock member is in its unlock position.

The indicator 61 is supported by the housing 14 by any suitable means which enable it to slidably move in the direction of the arrows C and D adjacent an aperture 62 through said housing so that either the On or the Off indication may be seen clearly by a person using the instrument protected by the monitor device of the present invention.

The plate of the indicator 61 is initially positioned so that the indication Off is clearly seen through the aperture 62 when the lock member 21 is in its lock position and the control arm 27 thereof does not move the coupling rod 31. When the lock member 21 is moved to its unlock position, its control arm 27 moves the coupling rod 31 in a manner whereby the plate of the indicator 61 is moved in the direction of the arrow D and the On indication replaces the Off indication in the aperture 62. The indicator 61 thus indicates the position of the lock member 21 and thereby indicates the operating condition (On or Off) of the instrument or telephone protected by the monitor device of the present invention.

FIG. 13 is a schematic circuit diagram of an embodiment of the control circuit arrangement of the embodiment of the monitor device of FIG. 5 including an embodiment of an electrically operated indicator. The control circuit arrangement interconnecting the timer control 33', the lock member 21', the register control 29' and the source of electrical energy 37 is described with reference to FIG. 5. In the embodiment of FIG. 13, an electrical lamp unit 63 is connected in circuit with the timer control 33', the lock member 21' the register control 29' and the source of electrical energy 37, so that when said lock member is moved to its unlock position and the control arm 27' makes electrical contact with the control contact 36 to close the circuit, said lamp unit 63 is energized and is illuminated. The lamp unit 63 may have a distinctive color, such as, for example, red and/or it may be supported by the housing 14 adjacent an aperture through said housing marked On, such as, for example, the upper aperture 25 in the embodiment of FIG. 3.

The control circuit arrangement may comprise another circuit branch comprising the lock member 21', a lock or control contact 64, an electrical lamp unit 65 and a source of electrical energy 66 which may comprise any suitable A.C. or D.C. source of electrical energy. Thus, in the embodiment of FIG. 13, when the lock member 21' is moved to its lock position, the control arm 27' breaks electrical contact with the unlock control contact 36 and makes electrical contact with the lock control contact 64 to close the circuit of the lamp unit 65 and the source of electrical energy 66, so that said lamp unit 65 is energized and is illuminated. The lamp unit 65 may have a distinctive color, different from that of the lamp unit 63, such as, for example, green and/or it may be supported by the housing 14 adjacent an aperture through said housing marked Off, such as, for example, the lower aperture 25 in the embodiment of FIG. 3.

It is obvious that only one of the lamps 63 and 65 need and may be utilized to provide a clear indication of the (On or Off) operating condition of the instrument or telephone protected by the monitor device of the present invention.

When the lock member 21' is in its lock position, as shown in FIG. 13, its control arm 27' contacts the lock control contact 64 and closes the circuit 21', 64, 65, 66 to energize the lamp 65. When the lock member 21' is in its unlock position, its control arm 27' contacts the unlock control contact 36 and closes the circuit 21' 36, 29', 63, 37, 33' to energize the lamp 63. The indicator 63, 65 thus indicates the position of the lock member 21' and thereby indicates the operating condition (On or Off) of the instrument or telephone protected by the monitor device of the present invention.

The housing 14 may comprise any suitable material of light weight, good durability, strength and ruggedness, such as, for example, sheet metal, aluminum or plastic.

While the invention has been described by means of specific examples and in specific embodiments, we do not wish to be limited thereto, for obvious modifications will occur to those skilled in the art without departing from the spirit and scope of the invention.

What we claim is:

1. A monitor device for an instrument having a switch adapted to put said instrument in a first condition of operation in a first condition of said switch and to put said instrument in a second condition of operation in a second condition of said switch, said monitor device comprising, in combination, housing means adapted to be positioned in proximity with said instrument; locking means for controlling the condition of the switch of said instrument, said locking means being supported by said housing means and being adapted to cooperate with the switch of said instrument to maintain said switch in its first condition in a lock condition of said locking means and to permit said switch to maintain its second condition in an unlock condition of said locking means; registering means for registering the number of times said locking means is in its unlock condition, said registering means being supported by said housing means in spaced relation to said locking means and being adapted to be operated by said locking means each time said locking means changes from its lock to its unlock condition; and timing means for indicating the period of time elapsed between activation and deactivation thereof, said timing means being supported by said housing means in spaced relation to said locking means and said registering means and being adapted to be activated by said locking means each time said locking means changes from its lock to its unlock condition and to be deactivated by said locking means each time said locking means changes from its unlock to its lock condition.

2. A monitor device for an instrument having a switch adapted to put said instrument in a first condition of operation in a first condition of said switch and to put said instrument in a second condition of operation in a second condition of said switch, said monitor device comprising, in combination, housing means adapted to be positioned in proximity with said instrument; locking means for controlling the condition of the switch of said instrument, said locking means being supported by said housing means and being adapted to cooperate with the switch of said instrument to maintain said switch in its first condition in a lock condition of said locking means and to permit said switch to maintain its second condition in an unlock condition of said locking means; registering means for registering the number of times said locking means is in its unlock condition, said registering means being supported by said housing means in spaced relation to said locking means and being adapted to be operated by said locking means each time said locking means changes from its lock to its unlock condition; timing means for indicating the period of time elapsed between activation and deactivation thereof, said timing means being supported by said housing means in spaced relation to said locking means and said registering means and being adapted to be activated by said locking means each time said locking means changes from its lock to its unlock condition and to be deactivated by said locking means each time said locking means changes from its unlock to its lock condition; and indicating means for indicating the condition of said locking means, said indicating means being supported by said housing means in spaced relation to said locking means, said registering means and said timing means and being adapted to indicate an On condition when said locking means is in its unlock condition and an Off condition when said locking means is in its lock condition.

3. A monitor device for an instrument having a switch adapted to put said instrument in a first condition of operation in a first condition of said switch and to put said instrument in a second condition of operation in a second condition of said switch, said monitor device comprising, in combination, housing means adapted to be positioned in proximity with said instrument; locking means for controlling the condition of the switch of said instrument, said locking means being supported by said housing means and having a locking arm adapted to cooperate with the switch of said instrument to maintain said switch in its first condition in a lock condition of said locking arm and to permit said switch to maintain its second condition in an unlock condition of said locking arm and locking control means adapted to cooperate with the locking arm of said locking means to maintain said locking arm in its lock condition in a lock position of said locking control means and to maintain said locking arm in its unlock condition in an unlock position of said locking control means; registering means for registering the number of times said locking control means is in its unlock position, said registering means being supported by said housing means in spaced relation to said locking means and being coupled to said locking control means in a manner whereby said registering means is operated by said locking control means each time said locking control means changes from its lock to its unlock position; and timing means for indicating the period of time elapsed between activation and deactivation thereof, said timing means being supported by said housing means in spaced relation to said locking means and said registering means and being coupled to said locking control means in a manner whereby said timing means is activated by said locking control means each time said locking control means changes from its lock to its unlock position and is deactivated by said locking control means each time said locking control means changes from its unlock to its lock position.

4. A monitor device for an instrument having a switch adapted to put said instrument in a first condition of operation in a first condition of said switch and to put said instrument in a second condition of operation in a second condition of said switch, said monitor device comprising, in combination, housing means adapted to be positioned in proximity with said instrument; locking means for controlling the condition of the switch of said instrument, said locking means being supported by said housing means and having a locking arm adapted to coöperate with the switch of said instrument to maintain said switch in its first condition in a lock condition of said locking arm and to permit said switch to maintain its second condition in an unlock condition of said locking arm and locking control means adapted to cooperate with the locking arm of said locked means to maintain said locking arm in its lock condition in a lock position of said locking control means and to maintain said locking arm in its unlock condition in an unlock position of said locking control means; registering means for registering the number of times said locking control means is in its unlock position, said registering means being supported by said housing means in spaced relation to said locking means and being coupled to said locking control means in a manner whereby said registering means is operated by said locking control means each time said locking control means changes from its lock to its unlock position; timing means for indicating the period of time elapsed between activation and deactivation thereof, said timing means being supported by said housing means in spaced relation to said locking means and said registering means and being coupled to said locking control means in a manner whereby said timing means is activated by said locking control means each time said locking control means changes from its lock to its unlock position and is deactivated by said locking control means each time said locking control means changes from its unlock to its lock position; and indicating means for indicating the position of said locking control means, said indicating means being supported by said housing means in spaced relation to said locking means, said registering means and said timing means and being adapted to indicate an On condition when said locking control means is in its unlock position and an Off condition when said locking control means is in its lock position.

5. A monitor device for an instrument having a switch adapted to put said instrument in a first condition of operation in a first condition of said switch and to put said instrument in a second condition of operation in a second condition of said switch, said monitor device comprising, in combination, housing means adapted to be positioned in proximity with said instrument; locking means for controlling the condition of the switch of said instrument, said locking means being supported by said housing means and having a locking arm adapted to cooperate with the switch of said instrument to maintain said switch in its first condition in a lock condition of said locking arm and to permit said switch to maintain its second condition in an unlock condition of said locking arm and locking control means adapted to cooperate with the locking arm of said locking means to maintain said locking arm in its lock condition in a lock position of said locking control means and to maintain said locking arm in its unlock condition in an unlock position of said locking control means; registering means for registering the number of times said locking control means is in its unlock position, said registering means being supported by said housing means in spaced relation to said locking means and being mechanically coupled to said locking control means in a manner whereby said registering means is operated by said locking control means each time said locking control means changes from its lock to its unlock position; timing means for indicating the period of time elapsed between activation and deactivation thereof, said timing means being supported by said housing means in spaced relation to said locking means and said registering means and being mechanically coupled to said locking control means in a manner whereby said timing means is activated by said locking control means each time said locking control means changes from its lock to its unlock position and is deactivated by said locking control means each time said locking control means changes from its unlock to its lock position; and indicating means for indicating the position of said locking control means, said indicating means being supported by said housing means in spaced relation to said locking means, said registering means and said timing means and being mechanically coupled to said locking control means to indicate an On condition when said locking control means is in its unlock position and an Off condition when said locking control means is in its lock position.

6. A monitor device for an instrument having a switch adapted to put said instrument in a first condition of operation in a first condition of said switch and to put said instrument in a second condition of operation in a second condition of said switch, said monitor device comprising, in combination, housing means adapted to be positioned in proximity with said instrument; locking means for controlling the condition of the switch of said instrument, said locking means being supported by said housing means and having a locking arm adapted to cooperate with the switch of said instrument to maintain said switch in its first condition in a lock condition of said locking arm and to permit said switch to maintain its second condition in an unlock condition of said locking arm and locking control means adapted to cooperate with the locking arm of said locking means to maintain said locking arm in its lock condition in a lock position of said locking control means and to maintain said locking arm in its unlock condition in an unlock position of said locking control means; registering means for registering the number of times said locking control means is in its unlock position, said registering means being supported by said housing means in spaced relation to said locking means and having electrically operated register control means; timing means for indicating the period of time elapsed between activation and deactivation thereof, said timing means being supported by said housing means in spaced relation to said locking means and said registering means and having electrically operated timing control means; indicating means for indicating the position of said locking control means, said indicating means being supported by said housing means in spaced relation to said locking means, said registering means and said timing means and having electrically operated indicating control means; a source of electrical energy; and electrical circuit means electrically coupling said source of electrical energy, said indicating control means, said timing control means, said register control means and said locking control means in a manner whereby said registering means is operated by said locking control means each time said locking control means changes from its lock to its unlock position, said timing means is activated by said locking control means each time said locking control means changes from its lock to its unlock position and is deactivated by said locking control means each time said locking control means changes from its unlock to its lock position, and said indicating means indicates an On condition when said locking control means is in its unlock position and an Off condition when said locking control means is in its lock position.

7. A telephone monitor device for a telephone having a line switch adapted to disconnect said telephone from a telephone line and thereby prevent its use in an open condition of said line switch and to connect said telephone to a telephone line and thereby permit its use in a closed condition of said line switch, said telephone monitor device comprising, in combination, housing means adapted to be positioned in proximity with said telephone; locking means for controlling the condition of the line switch of said telephone, said locking means being supported by said housing means and being adapted to cooperate with the line switch of said telephone to maintain said line switch in its open condition in a lock condition of said locking means and to permit said line switch to maintain its closed condition in an unlock condition of said locking means; registering means for registering the number of times said locking means is in its unlock condition, said registering means being supported by said housing means in spaced relation to said locking means and being adapted to be operated by said locking means each time said locking means changes from its lock to its unlock condition; and timing means for indicating the period of time elapsed between activation and deactivation thereof, said timing means being supported by said housing means in spaced relation to said locking means and said registering means and being adapted to be activated by said locking means each time said locking means changes from its lock to its unlock condition and to be deactivated by said locking means each time said locking means changes from its unlock to its lock condition.

8. A telephone monitor device for a telephone having a line switch adapted to disconnect said telephone from a telephone line and thereby prevent its use in an open condition of said line switch and to connect said telephone to a telephone line and thereby permit its use in a closed condition of said line switch, said telephone monitor device comprising, in combination, housing means adapted to be positioned in proximity with said telephone; locking means for controlling the condition of the line switch of said telephone, said locking means being supported by said housing means and being adapted to cooperate with the line switch of said telephone to maintain said line switch in its open condition in a lock condition of said locking means and to permit said line switch to maintain its closed condition in an unlock condition of said locking means; registering means for registering the number of times said locking means is in its unlock condition, said registering means being supported by said housing means in spaced relation to said locking means and being adapted to be operated by said locking means each time said locking means changes from its lock to its unlock condition; timing means for indicating the period of time elapsed between activation and deactivation thereof, said timing means being supported by said housing means in spaced relation to said locking means and said registering means and being adapted to be activated by said locking means each time said locking means changes from its lock to its unlock condition and to be deactivated by said locking means each time said locking means changes from its unlock to its lock condition; and indicating means for indicating the condition of said locking means, said indicating means being supported by said housing means in spaced relation to said locking means, said registering means and said timing means and being adapted to indicate an On condition when said locking means is in its unlock condition and an Off condition when said locking means is in its lock condition.

9. A telephone monitor device for a telephone having a line switch adapted to disconnect said telephone from a telephone line and thereby prevent its use in an open condition of said line switch and to connect said telephone to a telephone line and thereby permit its use in a closed condition of said line switch, said telephone monitor device comprising, in combination, housing means adapted to be positioned in proximity with said telephone; locking means for controlling the condition of the line switch of said telephone, said locking means being supported by said housing means and having a locking arm adapted to cooperate with the line switch of said telephone to maintain said line switch in its open condition in a lock condition of said locking arm and to permit said line switch to maintain its closed condition in an unlock condition of said locking arm and locking control means adapted to cooperate with the locking arm of said locking means to maintain said locking arm in its lock condition in a lock position of said locking control means and to maintain said locking arm in its unlock condition in an unlock position of said locking control means; registering means for registering the number of times said locking control means is in its unlock position, said registering means being supported by said housing means in spaced relation to said locking means and being coupled to said locking control means in a manner whereby said registering means is operated by said locking control means each time said locking control means changes from its lock to its unlock position; and timing means for indicating the period of time elapsed between activation and deactivation thereof, said timing means being supported by said housing means in spaced relation to said locking means and said registering means and being coupled to said locking control means in a manner whereby said timing means is activated by said locking control means each time said locking control means changes from its lock to its unlock position and is deactivated by said locking control means each time said locking control means changes from its unlock to its lock position.

10. A telephone monitor device for a telephone having a line switch adapted to disconnect said telephone from a telephone line and thereby prevent its use in an open condition of said line switch and to connect said telephone to a telephone line and thereby permit its use in a closed condition of said line switch, said telephone monitor device comprising, in combination, housing means adapted to be positoned in proximity with said telephone; locking means for controlling the condition of the line switch of said telephone, said locking means being supported by said housing means and having a locking arm adapted to cooperate with the line switch of said telephone to maintain said line switch in its open condition in a lock condition of said locking arm and to permit said line switch to maintain its closed condition in an unlock condition of said locking arm and locking control means adapted to cooperate with the locking arm of said locking means to maintain said locking arm in its lock condition in a lock position of said locking control means and to maintain said locking arm in its unlock condition in an unlock position of said locking control means; registering means for registering the number of times said locking control means is in its unlock position, said registering means being supported by said housing means in spaced relation to said locking means and being coupled to said locking control means in a manner whereby said registering means is operated by said locking control means each time said locking control means changes from its lock to its unlock position; timing means for indicating the period of time elapsed between activation and deactivation thereof, said timing means being supported by said housing means in spaced relation to said locking means and said registering means and being coupled to said locking control means in a manner whereby said timing means is activated by said locking control means each time said locking control means changes from its lock to its unlock position and is deactivated by said locking control means each time said locking control means changes from its unlock to its lock position; and indicating means for indicating the position of said locking control means, said indicating means being supported by said housing means in spaced relation to said locking means, said registering means and said timing means and being adapted to indicated an On condition when said locking control means is in its unlock position and an Off condition when said locking control means is in its lock position.

11. A telephone monitor device for a telephone having a line switch adapted to disconnect said telephone from a telephone line and thereby prevent its use in an open condition of said line switch and to connect said telephone to a telephone line and thereby permit its use in a closed condition of said line switch, said telephone monitor device comprising, in combination, housing means adapted to be positioned in proximity with said telephone; locking means for controlling the condition of the line switch of said telephone, said locking means being supported by said housing means and having a locking arm adapted to cooperate with the line switch of said telephone to maintain said line switch in its open condition in a lock condition of said locking arm an dto permit said line switch to maintain its closed condition in an unlock condition of said locking arm and locking control means adapted to cooperate with the locking arm of said locking means to maintain said locking arm in its lock condition in a lock position of said locking control means and to maintain said locking arm in its unlock condition in an unlock position of said locking control means; registering means for registering the number of times said locking control means is in its unlock position, said registering means being supported by said housing means in spaced relation to said locking means and being mechanically coupled to said locking control means in a manner whereby said registering means is operated by said locking control means each time said locking control means changes from its lock to its unlock position; timing means for indicating the period of time elapsed between activation and deactivation thereof, said timing means being supported by said housing means in spaced relation to said locking means and said registering means and being mechanically coupled to said locking control means in a manner whereby said timing means is activated by said locking control means each time said locking control means changes from its lock to its unlock position and is deactivated by said locking control means each time said locking control means changes from its unlock to its lock position; and indicating means for indicating the position of said locking control means, said indicating means being supported by said housing means in spaced relation to said locking means, said registering means and said timing means and being mechanically coupled to said locking control means to indicate an On condition when said locking control means is in its unlock position and an Off condition when said locking control means is in its lock position.

12. A telephone monitor device for a telephone having a line switch adapted to disconnect said telephone from a telephone line and thereby prevent its use in an open condition of said line switch and to connect said telephone to a telephone line and thereby permit its use in a closed condition of said line switch, said telephone monitor device comprising, in combination, housing means adapted to be positioned in proximity with said telephone; locking means for controlling the condition of the line switch of said telephone, said locking means being supported by said housing means and having a locking arm adapted to cooperate with the line switch of said telephone to maintain said line switch in its open condition in a lock condition of said locking arm and to permit said line switch to maintain its closed condition in an unlock condition of said locking arm and locking control means adapted to cooperate with the locking arm of said locking means to maintain said locking arm in its lock condition in a lock position of said locking control means and to maintain said locking arm in its unlock condition in an unlock position of said locking control means; registering means for registering the number of times said locking control means is in its unlock position, said registering means being supported by said housing means in spaced relation to said locking means and having electrically operated register control means; timing means for indicating the period of time elapsed between activation and deactivation thereof, said timing means being supported by said housing means in spaced relation to said locking means and said registering means and having electrically operated timing control means; indicating means for indicating the position of said locking control means, said indicating means being supported by said housing means in spaced relation to said locking means, said registering means and said timing means and having electrically operated indicating control means; a source of electrical energy; and electrical circuit means electrically coupling said source of electrical energy, said indicating control means, said timing control means, said register control means and said locking control means in a manner whereby said registering means is operated by said locking control means each time said locking control means changes from its lock to its unlock position, said timing means is activated by said locking control means each time said locking control means changes from its lock to its unlock position and is deactivated by said locking control means each time said locking control means changes from its unlock to its lock position, and said indicating means indicates an On condition when said locking control means is in its unlock position and an Off condition when said locking control means is in its lock position.

References Cited in the file of this patent
UNITED STATES PATENTS

| | | |
|---|---|---|
| 1,366,024 | Reubenstone | Jan. 18, 1921 |
| 1,647,142 | Mindlin | Nov. 1, 1927 |
| 2,604,940 | Heptinstall | July 29, 1952 |
| 2,641,659 | Benson | June 9, 1953 |